United States Patent [19]

Murakami et al.

[11] Patent Number: 4,664,793
[45] Date of Patent: May 12, 1987

[54] PURE WATER MANUFACTURING APPARATUS

[75] Inventors: Kenji Murakami; Yositaka Konomatu, both of Ooita; Kanro Sato, Yokosuka, all of Japan

[73] Assignee: Kabushiki Kaisha Toshiba, Kawasaki, Japan

[21] Appl. No.: 791,536

[22] Filed: Oct. 25, 1985

[30] Foreign Application Priority Data

Oct. 27, 1984 [JP] Japan ............................ 59-226153

[51] Int. Cl.$^4$ .............................................. C02F 1/02
[52] U.S. Cl. ................................. 210/181; 210/182; 210/184
[58] Field of Search ............ 210/774, 177, 181, 182, 210/184, 186, 187, 192, 202, 265; 422/26

[56] References Cited

U.S. PATENT DOCUMENTS

| | | | |
|---|---|---|---|
| 3,296,122 | 1/1967 | Karassik et al. | 210/774 X |
| 3,766,060 | 10/1973 | Smith | 210/774 X |
| 4,236,974 | 12/1980 | Kuhnlein | 210/182 X |
| 4,340,473 | 7/1982 | Lindman et al. | 210/181 X |

FOREIGN PATENT DOCUMENTS 54-34545  3/1979  Japan .

Primary Examiner—Tom Wyse
Attorney, Agent, or Firm—Finnegan, Henderson, Farabow, Garrett & Dunner

[57] ABSTRACT

A pure water manufacturing apparatus for producing ultra pure water to be used in the electronic and medical industries. This apparatus comprises a pure water circulation system consisting of a pure water storage tank, a first heat exchanger arranged at the downstream side of the tank for thermally sterilizing pure water, a filter arranged at the downstream side of the first heat exchanger for removing dead bacteria, a pure water circulating means, and a second heat exchanger for cooling pure water disposed between the filter and a terminal device at which pure water is required. The ultrapure water is supplied to the terminal device from the downstream side of the filter through the second heat exchanger.

4 Claims, 2 Drawing Figures

PURE WATER MANUFACTURING APPARATUS

BACKGROUND OF THE INVENTION (a) Field of the Invention

The present invention relates to a pure water manufacturing apparatus suitable for the manufacture of ultrapure water used in the electronic and medical drug industries.

(b) Description of the Prior Art

Semiconductor devices are becoming increasingly integrated, and patterns on the order of submicrons are required. In view of this, water having an extremely high purity is required. Similarly, in the medical drug industry high purity water is required to manufacture high-quality drugs.

In view of such a need, Japanese Patent Disclosure No. 54-34545 discloses a method of manufacturing water having a high degree of purity. According to this method, pure water is manufactured by a system having a circulation system consisting of an agglomerating/clarifying apparatus, a filtration apparatus, an ultraviolet sterilization apparatus, an ion exchanger, and a heat exchanger for heating and sterilizing pure water. In this system, when water is sufficiently pure with respect to live bacteria, heat exchange at the heat exchanger is not performed, and pure water passing through the filter is supplied to a terminal device at which pure water is required.

However, when the number of live bacteria in pure water flowing in the circulation system exceeds a predetermined level, the valve is closed to stop supply of untreated water. Pure water is then circulated by a pump and heated to 80° C. or higher by the heat exchanger, and sterilized.

The number of live bacteria in the pure water circulation system of a pure water manufacturing apparatus varies in accordance with external conditions, e.g., summer or winter time. Anyway, the number of live bacteria exponentially increases even after sterilization. Therefore, when the number of live bacteria in pure water exceeds a predetermined level (normally, 5 to 20/ml), sterilization must be performed immediately.

In such a conventional pure water manufacturing apparatus, the time required for sterilizing pure water varies depending upon the capacity of the sterilizing heat exchanger, the volume of the overall system, system design, and operating conditions such as sterilization temperature. However, it normally takes 3 to 7 hours due to various operations required for switching valves, heating the water and circulating the heated water. When pure water is required for use at the terminal device during the sterilization operation, only hot pure water is available. When the use of hot pure water is undesirable, the terminal device must be stopped until the pure water cools. In a manufacturing line which requires cooler pure water of about 35° C. or lower, as in the case of a semiconductor manufacturing line, the entire line must be stopped during sterilization of pure water.

The time required for live bacteria to exceed in number a predetermined level is from 2 days to one month depending upon external conditions. Assuming that the manufacturing line must be stopped for sterilization on an average of once in ten days, the line capacity falls to 90% of its maximum capacity. When a manufacturing line of an annual productivity of ten million dollars is assumed, the annual productivity of the line is reduced to 9 million, resulting in a loss of one million dollars.

SUMMARY OF THE INVENTION

The present invention has been made in consideration of this, and has, as its object, to provide a pure water manufacturing apparatus which does not require stoppage of a terminal device during a high temperature sterilization operation, and which allows for a maximum manufacturing capacity of the terminal device manufacturing line.

It is another object of the present invention to provide a pure water manufacturing apparatus, connected to a semiconductor manufacturing line, which can continue sterilization without requiring that the semiconductor manufacturing line connected to it be stopped during sterilization operation.

In order to achieve the above object of the present invention, there is provided a pure water manufacturing apparatus comprising a pure water circulation system consisting of a pure water storage tank, a heat exchanger for performing thermal sterilization arranged at the downstream side of the tank, a filter, for removing dead bacteria, arranged at the downstream side of the heat exchanger, and a drive means for circulating pure water, the pure water being supplied to a terminal device at the downstream side of the filter and at which pure water is required; characterized in that a heat exchanger for cooling pure water is inserted in the pure water path between the filter and the terminal device.

The pure water cooling heat exchanger can be inserted in a part of the pure water circulation system or connected externally to the pure water circulation system.

In the pure water manufacturing apparatus according to the present invention, the pure water heat exchanger is arranged at the downstream side of the dead bacteria filter, and pure water is sufficiently cooled to a temperature suitable for use at the terminal device. Therefore, even during the sterilization operation of pure water, the operation of the terminal device need not be interrupted, and a maximum production capacity of the terminal device can be guaranteed.

DETAILED DESCRIPTION OF THE PREFERRED EMBODIMENTS

The preferred embodiment of the present invention will be described with reference to FIG. 1. FIG. 2 shows another embodiment wherein three terminal devices (e.g., semiconductor manufacturing lines) are connected.

Figure 1:
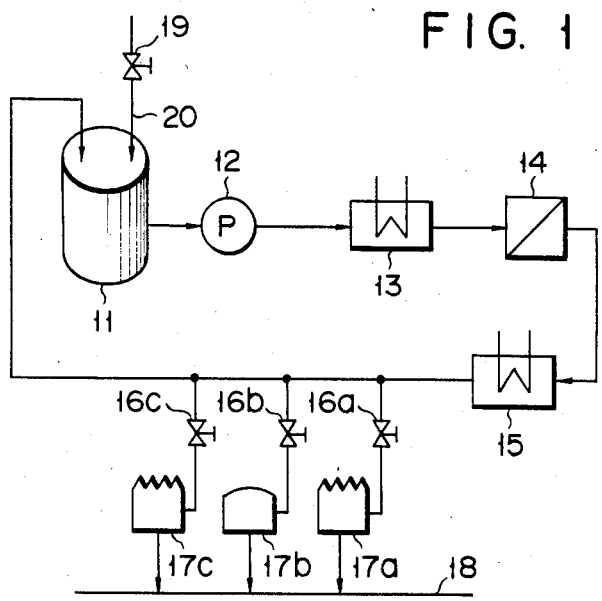
FIG. 1 is a flow chart of a pure water manufacturing apparatus according to an embodiment of the present invention.
Figure 2:
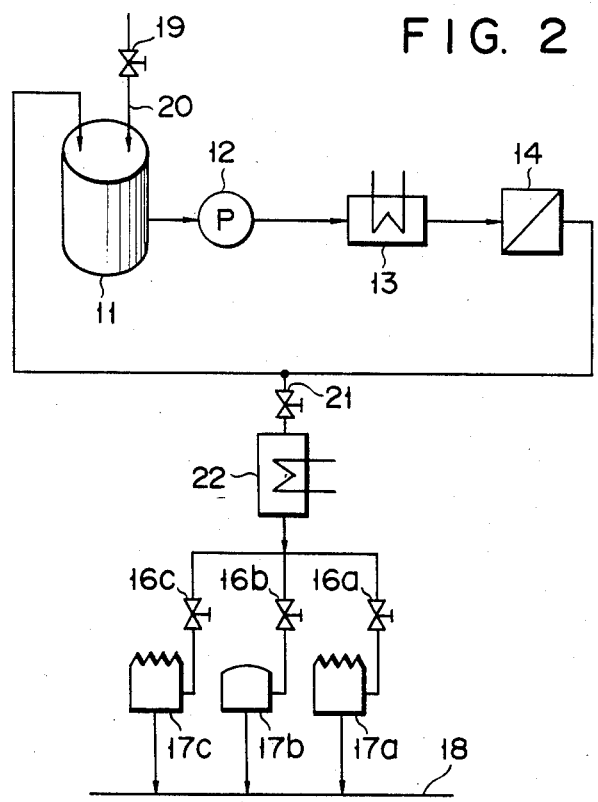
FIG. 2 is a flow chart of a pure water manufacturing apparatus according to another embodiment of the present invention.

Referring to FIG. 1, pure water in a tank 11 is circulated by a pump 12 in a circulation system consisting of an autoclave sterilizing heat exchanger 13, a dead bacteria filter 14, and a cooling heat exchanger 15. When pure water is sufficiently pure with respect to live bacteria, heat exchange by the heat exchangers 13 and 15 is not performed. Pure water passing through the filter 14 and the heat exchanger 15 is supplied to terminal devices 17a, 17b and 17c through valves 16a, 16b and 16c, respectively. Exhaust water from the respective devices flows to an exhaust line 18. Un-used pure water is returned to the tank 11. Pre-treated water, in an amount corresponding to the amount of pure water required at the devices 17a, 17b and 17c, is supplied to the tank 11 through a supply pipe 20 with a valve 19 from a primary pure water manufacturing apparatus comprising an agglomerating/clarifying apparatus, a filtration apparatus, an ultraviolet sterilization apparatus, an ion exchanger and the like. When the number of live bacteria in pure water flowing in the circulation system exceeds a predetermined level, the pure water is heated to 60° to 90° C. by the heat exchanger 13 while it is circulated by the pump 12, as in normal operation. Pure water passing through the filter 14 is cooled by the heat exchanger 15 to a temperature at which it is normally used at the devices 17a, 17b and 17c. The cooled pure water is then supplied to the terminal devices 17a, 17b and 17c through the valves 16a, 16b and 16c.

In this apparatus, the terminal devices 17a, 17b and 17c need not be stopped during the sterilization operation, and maximum production capacity of the manufacturing line can be realized.

In this embodiment, the cooling heat exchanger 15 is arranged at the downstream side of the filter 14 so as to partially constitute the circulation system of pure water. However, the arrangement need not be limited to this, and an arrangement as shown in FIG. 2 can be used. In the pure water manufacturing apparatus shown in FIG. 2, the pure water circulation system consists of the tank 11, the pump 12, the heat exchanger 13 and the filter 14. A valve 21 and a cooling heat exchanger 22 are inserted between the pipe downstream of the filter 14 and the terminal manufacturing line. In this apparatus, the same effect as that obtained with the apparatus shown in FIG. 1 can be obtained.

In the pure water manufacturing apparatus according to the present invention, normal temperature pure water can be supplied without requiring stoppage of terminal manufacturing lines even during thermal sterilization of pure water, such that maximum production capacity of the lines can be realized.

What is claimed is:

1. A pure water manufacturing apparatus comprising:
    a pure water circulating system including;
        a pure water storage tank connected to a primary pure water manufacturing apparatus comprising an agglomerating/clarifying apparatus, a filtration apparatus, an ultraviolet sterilization apparatus and an ion exchanger, with said tank being supplied with primarily treated water from said primary pure water manufacturing apparatus,
        a heat exchanger for performing thermal sterilization arranged downstream of said tank; and
        a filter for removing bacteria positioned immediately downstream of said heat exchanger;
    means for circulating pure water through said pure water circulating system; and
    a heat exchanger for cooling pure water positioned in a pure water path between said filter and a terminal device at which pure water is required.

2. An apparatus according to claim 1, wherein said terminal device is a semiconductor manufacturing line.

3. An apparatus according to claim 1, wherein a heat exchanger for cooling the pure water is inserted in said pure water circulation system.

4. An apparatus according to claim 1, wherein a heat exchanger for cooling the pure water is arranged outside said pure water circulation system.

* * * * *